May 9, 1967 B. L. TARMY ETAL 3,318,735
FUEL CELL EMPLOYING INTERNAL PRIMARY OXIDANT REGENERATION
Filed Oct. 19, 1962 3 Sheets-Sheet 1

FIGURE I

BARRY L. TARMY
JOSEPH A. SHROPSHIRE   Inventors
CHARLES H. WORSHAM

By *W.A. Heilman*

Patent Attorney

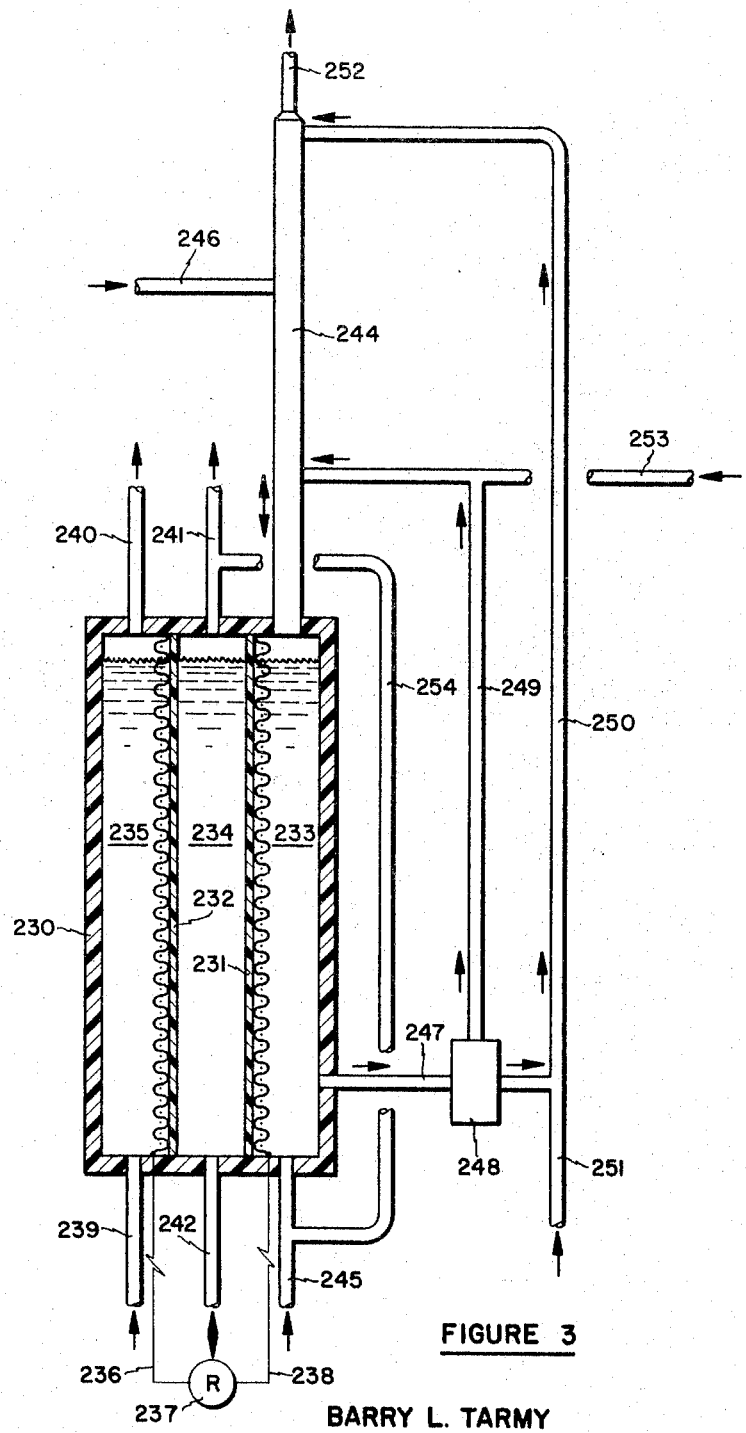

3,318,735
FUEL CELL EMPLOYING INTERNAL PRIMARY OXIDANT REGENERATION

Barry L. Tarmy, Berkeley Heights, Joseph A. Shropshire, Westfield, and Charles H. Worsham, Fanwood, N.J., assignors to Esso Research and Engineering Company, a corporation of Delaware
Filed Oct. 19, 1962, Ser. No. 231,738
3 Claims. (Cl. 136—86)

This invention relates to electrochemical conversion of chemical energy to electrical energy. In particular, this invention relates to a novel fuel cell and to a process for the operation of a fuel cell wherein a combustible fuel is is anodically oxidized, nitric acid or a partial reduction product thereof is cathodically reduced and the gaseous reduction products thereof are chemically regenerated to reform nitric acid by contacting such gaseous product with a gaseous secondary oxidant in the presence of an aqueous liquid electrolyte.

The term "fuel cell" is used herein and in the art to denote a device, system or apparatus wherein chemical energy of a combustible fuel is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte, and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. In certain embodiments, two or more of such partitions may be employed to further subdivide the electrolyte compartment, e.g. as where a central electrolyte compartment is provided between electrodes and the aforementioned anolyte and catholyte compartments are positioned on the opposite sides of the respective electrodes. Thus, in each such cell hydrogen gas or a fluid organic fuel is electrochemically oxidized at the anode with a release of electrons to such anode and an oxidant is electrochemically reduced at the cathode upon receiving electrons from such cathode.

With respect to the reduction of oxidant in the cathodic half cell, fuel cells can be divided into two general types. In this division, the first group would then include those cells wherein the direct or primary oxidant is free oxygen admitted to the catholyte as oxygen gas, air, hydrogen peroxide, etc., and is electrochemically reduced at the cathode. The second group includes those cells wherein the direct or primary oxidant comprises an oxygen comprising compound which is electrochemically reduced at the cathode and subsequently chemically regenerated by a secondary oxidant which may be one or more of the conventional oxidants of the first group. This invention is concerned with those cells of the aforementioned second group wherein the primary oxidant employed is nitric acid or a partial reduction product thereof and wherein the reduction products of such primary oxidant are chemically reoxidized with free oxygen gas, e.g. oxygen, hydrogen peroxide, a gaseous mixture having oxygen therein, to regenerate nitric acid or a reducible reduction product thereof.

It has now been discovered that the regeneration of nitric acid from its gaseous reduction products is greatly facilitated by contacting such gaseous products with chemically uncombined oxygen in a gaseous phase and bringing the two gases and/or the reaction product thereof into continuous or intermittent contact with aqueous electrolyte.

The electrochemical reduction of the primary oxidant at the cathode can be expressed by the following equation:

$$HNO_3 + 3H^+ + 3e \rightarrow NO + 2H_2O$$

Economical operation of such a cell requires that the NO be regenerated to nitric acid for reuse at the cathode and that the losses thereof with the escaping secondary oxidant be minimized.

The rate of regeneration of nitric acid or a reducible reduction product thereof is surprisingly increased and hence the loss of NO gas greatly reduced if such gas is first contacted with oxygen in a gas phase and the reaction product thereof passed in or through an aqueous acid electrolyte which preferably is of the same composition and concentration as the catholyte of the cell with which such operation is associated.

As aforementioned, the reactivation of the primary oxidant is effected by bringing the NO gas formed at the cathode into intimate contact with oxygen gas and thence into intimate contact with the acidic electrolyte.

For maximum efficiency it is necessary that the NO contact oxygen gas of sufficient quantity and for a sufficient time to convert essentially all of the NO to $NO_2$.

In one embodiment of this invention the catholyte is caused to flow countercurrently to the flow of secondary oxidant through the catholyte compartment of the cell.

In a second embodiment the flow of electrolyte and secondary oxidant through the catholyte compartment is a cocurrent flow which is continuously removed from the cell proper and at least a portion of the regeneration of primary oxidant effected in an external regeneration zone.

In a third embodiment, regeneration is effected within the catholyte compartment of the cell.

When nitric acid or a reducible reduction product thereof, e.g. $NO_2$, $N_2O_4$, or $HNO_2$, is employed as the primary oxidant the cell ordinarily will be operated with an electrolyte temperature in the range of about 120° F. to 210° F., preferably about 160° F. to 190° F. at atmospheric pressure. The preferred electrolyte is aqueous sulfuric acid which may be employed in the conventional concentrations disclosed in the literature, e.g. about 10 to 40 wt. percent, preferably about 25 to 35 wt. percent. In the catholyte the primary oxidant is employed in concentrations of about 0.50 to 3.0 wt. percent or above, preferably in the range of about 0.80 to 1.20 wt. percent.

The primary oxidant may be introduced to the catholyte in the form of nitric acid, or a reduction product of nitric acid, e.g. $NO_2$, $N_2O_4$, or as a water soluble salt of such, as $NaNO_2$, $NaNO_3$, $KNO_2$ or $KNO_3$. The use of gaseous $NO_2$ as the main source of primary oxidant supply provides certain advantages over the use of the liquid nitric acid in that once in the cell the $NO_2$ rapidly and efficiently reacts with the water present to form $HNO_3$ and the need for transporting the water content of the $HNO_3$ to the cell installation site is eliminated.

The cold start-up of the cell is difficulty effected with $HNO_3$ alone. In cases where external heating is not available for start-up, the addition of small quantities of nitrite salts, e.g. $NaNO_2$, $KNO_2$, to the electrolyte is useful. Upon addition of the salt to the electrolyte the same will decompose in the acid medium to provide $HNO_2$, which is a satisfactory initiator for the reaction. In a preferred embodiment the reaction is initiated by the introduction of gaseous $NO_2$ both as initiator and primary oxidant supply.

This invention will be more easily understood from the accompanying drawings.

FIGURE 3 is a schematic cross section of a fuel cell assembly adapted for external regeneration of the primary oxidant in accordance with the process of this invention wherein gaseous fluid from the cathodic half cell is contacted countercurrently with electrolyte.

Figure 1:
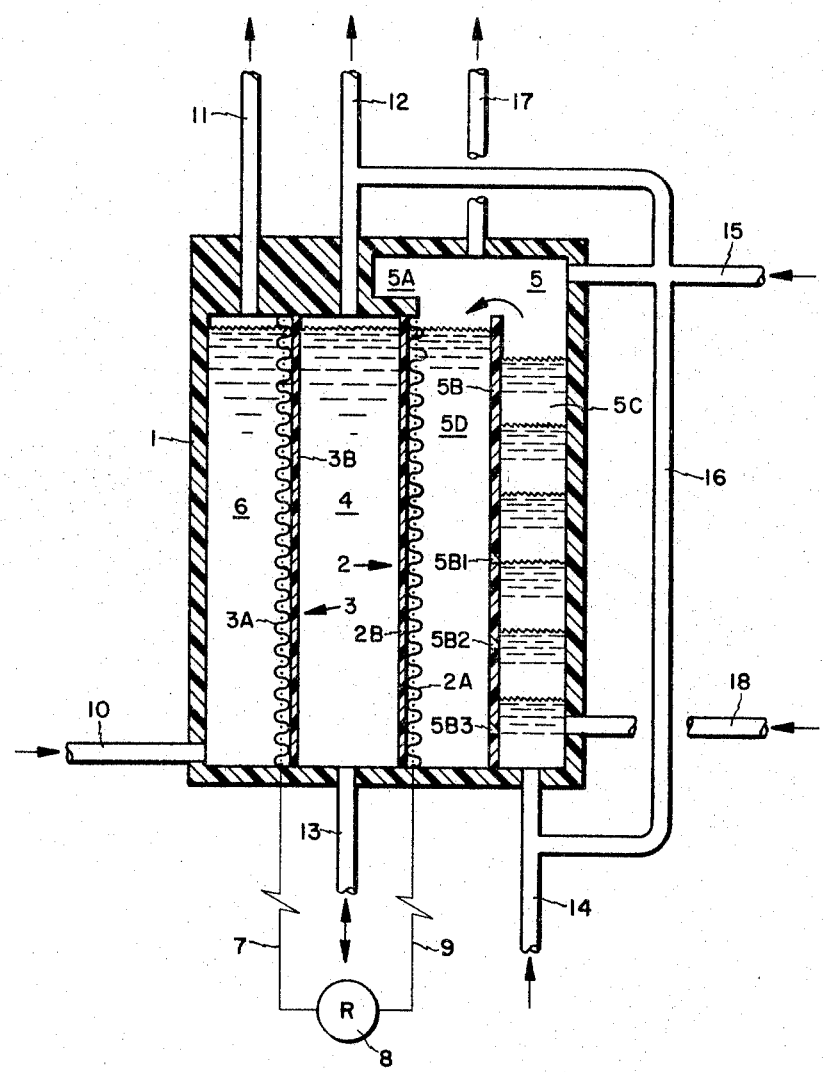
FIGURE 1 is a schematic cross section of a fuel cell adapted for internal regeneration of the primary oxidant in accordance with the process of this invention.

Referring now to FIGURE 1, there is shown a fuel cell container or vessel 1 containing a cathode assembly 2, an anode assembly 3, a central electrolyte compartment 4, a catholyte compartment 5 and an anolyte compartment 6. Cathode assembly 2 and anode assembly 3 each include a wire screen electrode 2A and 3A respectively, surfaces of which are coated with a suitable catalytic material. Such electrode screen members are employed in conjunction with a porous organic membrane. Such membranes 2B and 3B respectively, are in contact with the respective screen member and positioned between the respective screen member and central electrolyte compartment 4. Electrodes 2A and 3A are electrically connected via wires 7 and 9 and resistance means 8 which is symbolic of any electrical device or appliance adapted for receiving its power of activation from a direct electric current. Fuel inlet conduit 10 provides means for introducing an electrolyte soluble fuel, e.g. methanol into anolyte compartment 6 which is here shown to be substantially filled with an aqueous sulfuric acid electrolyte. Fuel exhaust conduit 11 provides means for removing carbon dioxide formed at anode 3A in electrochemical oxidation of the fuel. The central electrolyte compartment 4 is shown equipped with conduits 12 and 13 which may be utilized for a variety of purposes. These include providing escape means for any gaseous product formed at either of the electrodes which may escape from their respective compartments through membranes 2B and 3B, providing means for replenishing electrolyte in compartment 4 and to provide means for flushing or cleansing the compartment. In catholyte compartment 5 there is shown a regeneration zone 5A comprising the enlarged upper portion of catholyte compartment 5. Below zone 5A compartment 5 is separated by an electrolyte permeable barrier 5B into a cathodic reaction zone 5D and catholyte recycle zone 5C. Catholyte compartment 5, is, in this embodiment, shown communicating with a lower air inlet conduit 14 and an upper air inlet conduit 15. Conduits 12, 14 and 15 are connected by pressure control conduit 16 providing control means for maintaining a balance of pressure in catholyte compartment 5 and central electrolyte compartment 4. Catholyte compartment 5 also communicates with air exhaust conduit 17 providing means of escape for air or other oxidant, e.g. oxidant gas admitted to catholyte compartment 5 via conduits 14 and 15. In a preferred embodiment air is admitted via conduit 14 to recycle zone 5C of catholyte compartment 5 so as to provide a bubble-like or slug type flow of air and electrolyte upward through zone 5C into regeneration zone 5A where additional air is admitted from conduit 15. The electrolyte in catholyte compartment 5 comprises aqueous sulfuric acid, e.g. 30 wt. percent to which the primary oxidant, nitric acid, has been added. In the embodiment shown in FIGURE 1 both primary oxidant and electrolyte may be added to catholyte compartment 5 via inlet conduit 18. The primary oxidant and electrolyte are passed downward through reaction zone 5D and the primary oxidant, i.e. $HNO_3$ or a reducible reduction product thereof, is electrochemically reduced upon contact with cathode 2A to the ultimate reduction product NO. Part of the NO is carried as a vapor to regeneration zone 5A. Regeneration zone 5A may be packed with glass wool to entrap the aforementioned NO and facilitating the reoxidition thereof to nitric acid as hereinbefore explained. The liquid electrolyte together with the remaining part of the reduction products of nitric acid passes into catholyte recycle zone 5C through one or more openings in barrier 5B. Barrier 5B has several openings in the lower portion thereof for the return flow of electrolyte and reduction products to recycle zone 5C, three such openings, $5B_1$, $5B_2$, and $5B_3$ are shown here. As here shown, these pores or channels diminish in diameter at the end opening into the recycle zone 5C to minimize the escape of air from zone 5C.

Figure 2:
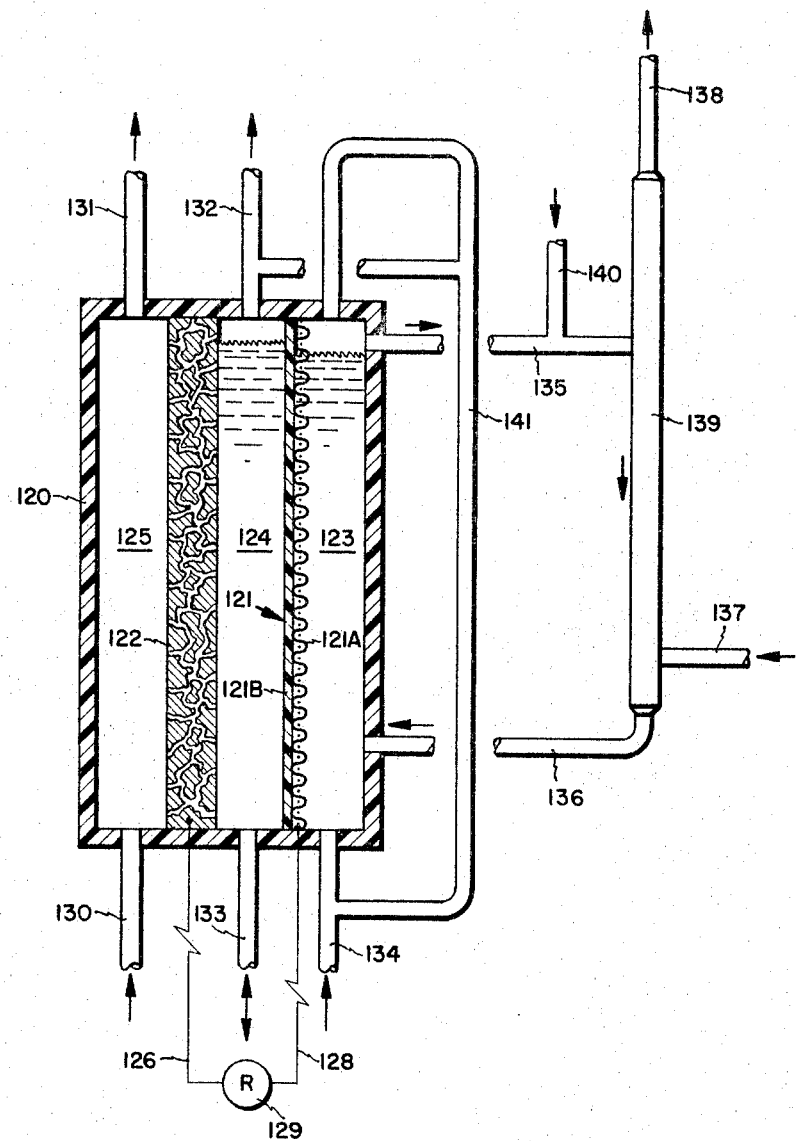
FIGURE 2 is a schematic cross section of a fuel cell assembly adapted for external regeneration of the primary oxidant in accordance with the process of this invention wherein the catholyte and cathodic reduction products are circulated in cocurrent flow.

Referring now to FIGURE 2 there is shown a fuel cell container or vessel 120 which contains a cathode assembly 121 comprising a wire screen electrode 121A and a porous organic membrane 121B similar or identical to 2A or 2B of FIGURE 1 and a porous carbon anode 122. Cathode 121A and anode 122 are here shown electrically connected by wires 126, 128 and resistance means 129 which serve the same purpose as the external circuit of FIGURE 1, i.e. 7, 8 and 9 of FIGURE 1. Cathode assembly 121 and anode 122 divide the interior of vessel 120 into a catholyte compartment 123, a central electrolyte compartment 124 and a fueling compartment 125. Fuel inlet conduit 130 provides means for passing a gaseous combustible fuel, such as hydrogen gas or a gaseous hydrocarbon, into fueling compartment 125 and into the pores of anode 122 through which such fuel gas migrates until it contacts electrolyte from compartment 124 and forms with such electrolyte and anode 122 a three-phase contact. Fuel exhaust conduit 131 provides means for removing unused fuel in compartment 125 and with organic fuels removal of carbon dioxide and/or other gases. Central electrolyte compartment 124 communicates with upper exhaust conduit 132 which is here primarily used to permit the escape of carbon dioxide when an organic fuel is employed and to provide means for maintaining the pressure in the cell. At or near the bottom of compartment 124 the compartment communicates with conduit 133 which may be used to drain the compartment. Catholyte compartment 123 containing aqueous sulfuric acid electrolyte and the primary oxidant receives a continuous flow of air through air inlet conduit 134. Again as in FIGURE 1, it is preferred to control the size of this compartment and the rate of air flow such as to provide a bubbling or slug-like flow of electrolyte and primary oxidant upward through compartment 123 in contact with cathode 121A whereby the primary oxidant is electrochemically reduced at the cathode surface and the resulting reduction products, particularly NO, are removed overhead via conduit 135 and thence carried into oxidant regenerator 139 which comprises a column-like structure adapted to retain a liquid electrolyte, i.e. aqueous sulfuric acid of the concentration used in the cell. Column 139 is preferably packed with small pieces of an inert material having a large surface area per unit volume, i.e. glass helices, glass wool, glass beads, quartz, ceramic material, charcoal. Air is admitted into conduit 135 via air inlet conduit 140. Conduit 135 is positioned so as to discharge the aerated stream of electrolyte and nitric acid reduction products into column 139. Additional air may be admitted to column 139 via air inlet conduit 137. Oxidant regeneration column 139 is also equipped with an exhaust conduit 138 through which the air stream escapes to the atmosphere. In some embodiments it may be desirable to recycle at least a portion of this stream back to catholyte compartment 123 to further minimize losses of NO. Column 139 also communicates near the bottom thereof with recycle conduit 136 through which electrolyte and regenerated nitric acid are returned from column 139 to catholyte compartment 123. Conduits 132, 134 and 140 are here shown to be interconnected by pressure control conduit 141 to facilitate the balance of pressures in the cell.

Referring now to FIGURE 3 there is shown a fuel cell container or vessel 230 which contains a cathode assembly 231 and an anode assembly 232 of the same type shown in FIGURE 1. Cathode assembly 231 and anode assembly 232 divide the interior vessel 230 into a catholyte compartment 233, a central electrolyte compartment 234 and an anolyte compartment 235 and are electrically connected by wire 236, resistance means 237 and wire 238. Fuel inlet conduit 239 provides means for introducing an electrolyte soluble fuel into anolyte compartment 235 which is here shown containing a liquid electrolyte, e.g. sulfuric acid. Fuel exhaust conduit 240 provides exhaust means for removing carbon dioxide formed at the anode. Central electrolyte compartment 234 communicates with conduits 241 and 242 which serve the same functions as the corresponding conduits in FIGURE 1. Electrolyte compartment 234 also contains the same aqueous electrolyte. Aqueous sulfuric acid electrolyte is continuously admitted to anolyte compartment 233 from oxidant regeneration column 244. The chemical or secondary oxidant, e.g. air, is introduced into catholyte compartment 233 countercurrently to the flow of electrolyte therein via air inlet conduit 245. The upward movement of this air stream through catholyte compartment 233 sweeps with it the gaseous reduction products of the primary oxidant and carries the same into oxidant regeneration column 244 where they are intermixed with the electrolyte therein so as to entrap NO gas and reoxidize the same to nitric acid. Oxidant regeneration column 244 is preferably packed with an inert material, i.e. glass helices, glass wool, glass beads, pieces of quartz, pieces of ceramic. If needed, additional air may be introduced into column 244 via air inlet conduit 246. To complete the circulation of electrolyte, electrolyte is removed from anolyte compartment 233 at or near the bottom thereof via electrolyte recycle conduit 247 which passes through degassing drum 248 which provides escape means for gaseous reduction products of nitric acid, such as NO and $NO_2$ which escape upward via conduit 249 which communicates with column 244 so as to release such products into the main upward gas stream. The liquid electrolyte from degassing drum 248 enters electrolyte recycle conduit 250 through which it is passed to an upper portion of oxidant regeneration column 244. The transfer of electrolyte through conduit 250 may be effected by pumping means (not shown here) or the electrolyte may be propelled through conduit 250 by introducing a stream of air into conduit 250 via air inlet conduit 251. Oxidant regeneration column 244 has outlet means via conduit 252 for escape of air to the atmosphere. Provision may also be made for recycling the contents of conduit 252 to catholyte compartment 233 to further minimize the loss of NO gas. Air inlet conduit 253 which communicates with conduit 249 provides means for introduction of air into the gas stream between the cell proper and the oxidant regeneration zone. Conduits 241 and 245 are here shown to be interconnected by pressure control conduit 254 to facilitate the equilization of air pressure in compartments 233 and 234.

Variations of the instant process within the scope of this invention are set forth in the following illustrative examples which are for purposes of illustration only and should not be considered to be limitations upon the true scope of the invention as set forth in the claims.

*Example 1*

In the demonstration $NO_2$ was bubbled through a cell containing 100 ml. 30% $H_2SO_4$ at 82° C., and then the acidity was determined by analysis at various time intervals. The experiment was also done using water.

The nitrogen oxides were fed at 72 cc./min. and consisted of an equilibrium mixture of about 82% $N_2O_4$ and 18% $NO_2$. The production of nitric acid with time was found to amount to 0.97 equivalent of $HNO_3$ per liter of solution per hour for both the $H_2SO_4$ and water solutions or 36.3 cc./min. nitrogen oxide uptake up to 10% $HNO_3$ content. But during the initial reaction period in the production of 1% $HNO_3$, the uptake was complete. Since 1% $HNO_3$ is an efficient oxidant concentration, then these data show that with efficient gas-liquid contacting a high degree of regeneration can be obtained.

*Example 2*

The process was used in a fuel cell using 0.25 M methanol in 3.7 M (or 30 wt. percent) $H_2SO_4$ anolyte and 1% $HNO_3$ in 30 wt. percent $H_2SO_4$ catholyte at 60 to 77° C. Data were taken during a 522 minute run. In this run air was bubbled into the catholyte at 1.5–1.7 stoichiometric ratio to the current. The current density was about 30 amps/ft.$^2$ with polarization of 0.57 and 0.27 volt at the anode and cathode respectively. Analyses of the solutions and gases showed that 2.9 regenerations of the $HNO_3$ has been accomplished but some of the gases had been lost. Gas loss can be avoided or minimized by design but the data show that the $HNO_3$ can be regenerated in accordance with this process.

*Example 3*

The process was used in a fuel cell using 0.20 M methanol in 3.7 M (30 wt. percent) sulfuric acid anolyte and 1 wt. percent nitric acid in 30 wt. percent sulfuric acid catholyte at 71 to 81° C. Data were taken during a 55 hour run. In this run air was bubbled into the bottom of an external, glass helices-packed column. The air flowed upward in countercurrent flow to the recycle catholyte flowing down the column into the fuel cell. The column temperature was maintained between 30 and 37° C. The air was bubbled at 1.5 stoichiometric ratio to the current. The current density was 39 amps/ft.$^2$ with polarization of 0.58 and 0.26 volt at the anode and cathode respectively. Analysis showed that 2.5 regenerations of the nitric acid had been accomplished.

*Example 4*

A test was run using 0.25 M methanol in 3.7 M (30 wt. percent) sulfuric acid anolyte and 1 wt. percent nitric acid in 30 wt. percent sulfuric acid catholyte. The cell temperature was maintained at 82 to 84° C. during the 12 hour run. In this test air was bubbled into both the fuel cell and into the bottom of an external column packed with glass helices as in Example 3. The column temperature was maintained between 40 to 57° C. The air was split 62% through the column and 38% into the cell. The total air fed amounted to 0.6 stoichiometric ratio to the current. The current density was 58 amps/ft.$^2$ with polarization of 0.52 and 0.21 volt at the anode and cathode respectively. Two regenerations of the $HNO_3$ were accomplished.

What is claimed is:

1. In a fuel cell wherein a primary oxidant is electrochemically reduced at the cathode and subsequently chemically regenerated, said fuel cell employing an aqueous liquid electrolyte, the improvement comprising an anolyte compartment, a catholyte compartment, a porous membrane separating said anolyte compartment and said catholyte compartment, said catholyte compartment divided by an electrolyte permeable barrier into a cathodic reaction zone and a catholyte recycle zone; an internal primary oxidant regeneration zone in the upper part of said catholyte compartment and communicating with said cathodic reaction zone and said catholyte recycle zone; means for admitting gaseous oxygen into said regeneration zone and means for admitting aqueous liquid electrolyte and the liquid cathodic reduction products of said primary oxidant from said cathodic reaction zone into said catholyte recycle zone.

2. A fuel cell as defined by claim 1 wherein said barrier is provided with several channels in the lower portion thereof, said channels diminishing in diameter at the end opening into said catholyte recycle zone.

3. A fuel cell, as defined by claim 1, wherein said regeneration zone is packed with an inert material having a large surface area per unit volume.

References Cited by the Examiner

UNITED STATES PATENTS

| | | | |
|---|---|---|---|
| 2,901,522 | 8/1959 | Bopp | 136—86 X |
| 3,009,327 | 11/1961 | Weil | 136—86 X |
| 3,113,049 | 12/1963 | Worsham | 136—86 |
| 3,116,170 | 12/1963 | Williams et al. | 136—86 |
| 3,152,013 | 10/1964 | Juda | 136—86 |
| 3,188,241 | 6/1965 | Weiss et al. | 136—86 |

FOREIGN PATENTS 12,818    1908    Great Britain.

WINSTON A. DOUGLAS, *Primary Examiner.*

ALLEN B. CURTIS, *Examiner.*